United States Patent
Jin et al.

(10) Patent No.: US 10,254,451 B2
(45) Date of Patent: Apr. 9, 2019

(54) DISPLAY DEVICE

(71) Applicant: Samsung Display Co., Ltd., Yongin-si, Gyeonggi-do (KR)

(72) Inventors: Kyongbin Jin, Suwon-si (KR); Minsu Kim, Seongnam-si (KR); Sujin Sung, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 191 days.

(21) Appl. No.: 15/236,134

(22) Filed: Aug. 12, 2016

(65) Prior Publication Data

US 2017/0146710 A1    May 25, 2017

(30) Foreign Application Priority Data

Nov. 19, 2015   (KR) .................. 10-2015-0162738

(51) Int. Cl.
| | |
|---|---|
| *G02B 13/14* | (2006.01) |
| *G02B 5/22* | (2006.01) |
| *G02B 3/00* | (2006.01) |
| *G02B 5/26* | (2006.01) |
| *G02F 1/1333* | (2006.01) |
| *G06F 1/16* | (2006.01) |
| *H04M 1/02* | (2006.01) |

(52) U.S. Cl.
CPC ............ *G02B 5/22* (2013.01); *G02B 3/0006* (2013.01); *G02B 5/26* (2013.01); *G02F 1/133308* (2013.01); *G06F 1/1601* (2013.01); *G06F 1/1626* (2013.01); *G06F 1/1637* (2013.01); *G06F 1/1656* (2013.01); *H04M 1/0266* (2013.01); *H04M 1/0283* (2013.01)

(58) Field of Classification Search
CPC ...... G02B 13/143; G02B 1/041; G02B 5/208; G02V 17/0892; G03F 7/70225
See application file for complete search history.

(56) References Cited

U.S. PATENT DOCUMENTS

| | | | |
|---|---|---|---|
| 2014/0253284 A1 | 9/2014 | Peterson et al. | |
| 2016/0077273 A1* | 3/2016 | Kim | G02B 6/0051 362/633 |
| 2016/0154436 A1* | 6/2016 | Woo | G06F 1/1652 345/173 |
| 2016/0161066 A1* | 6/2016 | Sung | H01L 33/502 362/84 |

FOREIGN PATENT DOCUMENTS

| | | |
|---|---|---|
| JP | 2012-208290 A | 10/2012 |
| KR | 10-1277727 | 6/2013 |
| KR | 10-2014-0109341 A | 9/2014 |
| KR | 10-1511524 B1 | 4/2015 |
| KR | 10-1512185 B1 | 4/2015 |
| WO | WO2015099258 A1 * | 7/2014 |

* cited by examiner

*Primary Examiner* — William R Alexander
*Assistant Examiner* — Tamara Y. Washington
(74) *Attorney, Agent, or Firm* — Lewis Roca Rothgerber Christie LLP

(57) ABSTRACT

A display device including a display panel comprising a window base substrate, a resin layer, a ultra violet (UV) pattern layer, a first color layer, a second color layer, a decoration layer, and a third color layer, and a display panel below a lower portion of the third color layer. The decoration layer comprises a cover layer and a logo layer.

20 Claims, 17 Drawing Sheets

DISPLAY DEVICE

CROSS-REFERENCE TO RELATED APPLICATION

This U.S. patent application claims priority to, and the benefit of, Korean Patent Application No. 10-2015-0162738, filed on Nov. 19, 2015, the entire content of which is hereby incorporated by reference.

BACKGROUND

1. Field

The present disclosure herein relates to a display device including display panel and a window module including a logo layer.

2. Description of the Related Art

Various display devices for supplying multimedia, such as televisions, mobile phones, navigation devices, computer monitors, and game consoles, are being developed. Such display devices include a display panel for displaying an image, and include a window module for covering the display panel.

The window module may be divided into a display area for transmitting an image, and a non-display area (e.g., a bezel area) that is adjacent the display area. The non-display area of the window module may block visibility of internal circuits or components. A logo of a product and a decoration may be provided at the non-display area.

SUMMARY

The present disclosure provides a display device including a window module on which a logo layer is aesthetically improved.

An embodiment of the present disclosure provides a display device including a window module including a window base substrate including a display part and a non-display part, a resin layer below a lower portion of the window base substrate at the non-display part, an ultra violet (UV) pattern layer below a lower portion of the resin layer, a first color layer below a lower portion of the UV pattern layer, and defining a first opening, a second color layer below a lower portion of the first color layer, and defining a second opening at least partially overlapping the first opening, a decoration layer in the first and second openings, and including a cover layer below the lower portion of the UV pattern layer, and a logo layer below a lower portion of the cover layer, and a third color layer below lower portions of the second color layer and the decoration layer, and a display panel below a lower portion of the third color layer.

Each of the UV pattern layer and the cover layer may have light transmittance of about 0.9 or more.

The cover layer may have a minimum thickness that is greater than a maximum thickness of the UV pattern layer.

The cover layer may have a maximum thickness that is less than a maximum thickness of the first color layer.

The logo layer may include a first sub logo layer in the second opening, and a second sub logo layer in the first opening, between the cover layer and the first sub logo layer, and integrated with the first sub logo layer.

The first sub logo layer may have a width that is greater than a width of the second sub logo layer.

The cover layer may have a maximum thickness that is greater than a maximum thickness of the first color layer.

The cover layer may include a first sub cover layer in the first opening, and a second sub cover layer in the second opening, between the first sub cover layer and the logo layer, and integrated with the first sub cover layer.

The second sub cover layer may have the same width as the first sub cover layer.

The second sub cover layer may have a width that is greater than a width of the first sub cover layer.

An entirety of a bottom surface of the resin layer may be covered by the UV pattern layer.

The second opening may have a width that is greater than a width of the first opening, and may expose a portion of the first color layer.

The first color layer may include a first sub color layer and a second sub color layer, which are spaced apart from each other, the second color layer may include a third sub color layer and a fourth sub color layer, which are spaced apart from each other, the first opening may be defined by a bottom surface of the UV pattern layer, an inner surface of the first sub color layer, and an inner surface of the second sub color layer, and the second opening may be defined by an inner surface of the third sub color layer, an inner surface of the fourth sub color layer, a portion of the first color layer that is exposed by the second opening, and a virtual surface that is defined by connecting ends of the inner surfaces of the first and second sub color layers that are opposite to the UV pattern layer.

The display device may further include an adhesion layer between the window base substrate and the resin layer.

The UV pattern layer may include a pattern having a lenticular shape.

The display device may further include a reflection layer, the UV pattern layer may be divided into an overlapping area that overlaps the first color layer, and a non-overlapping area that does not overlap the first color layer, and the reflection layer may be at the lower portion of the UV pattern at only the overlapping area.

Another embodiment of the present disclosure provides a display device including a window module including a window base substrate including a display part and a non-display part, a resin layer below a lower portion of the window base substrate at the non-display part, an ultra violet (UV) pattern layer below a lower portion of the resin layer, a first color layer below a lower portion of the UV pattern layer, and including a first sub color layer and a second sub color layer, which are spaced apart from each other, a cover layer below the lower portion of the UV pattern layer, and at least partially between the first sub color layer and the second sub color layer, a second color layer below the first color layer, and including a third sub color layer and a fourth sub color layer, which are spaced apart from each other, a logo layer below a lower portion of the cover layer, and between the third sub color layer and the fourth sub color layer, and a third color layer below lower portions of the second color layer and the logo layer, and a display panel below a lower portion of the third color layer.

Each of the UV pattern layer and the cover layer may have light transmittance of about 0.9 or more.

The cover layer may have a minimum thickness that is greater than a maximum thickness of the UV pattern layer.

The cover layer may contact each of the first and second sub color layers, and the logo layer may contact each of the third and fourth sub color layers.

BRIEF DESCRIPTION OF THE FIGURES

The accompanying drawings are included to provide a further understanding of the present disclosure, and are incorporated in, and constitute a part of, this specification.

The drawings illustrate exemplary embodiments of the present disclosure and, together with the description, serve to explain principles of the present disclosure. In the drawings.

DETAILED DESCRIPTION

Figure 1:
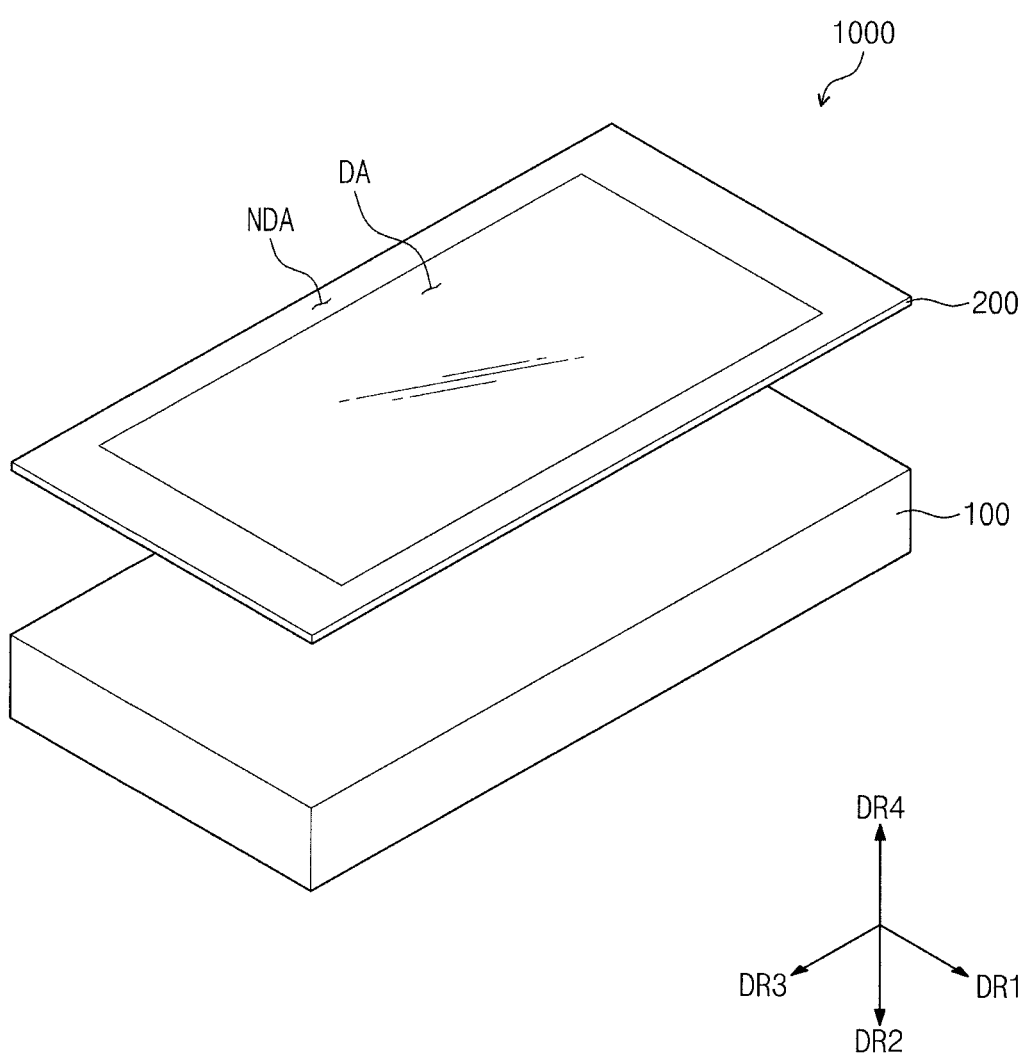
FIG. 1 is a schematic perspective view of a display device according to an embodiment of the present disclosure.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section.

Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a display device according to an embodiment of the present disclosure will be described with reference to FIGS. 1 to 13.

FIG. 1 is a schematic perspective view of a display device according to an embodiment of the present disclosure.

Referring to FIG. 1, a display device 1000 according to an embodiment of the present disclosure includes a display panel 100 and a window module 200 on the display panel 100. The window module 200 is on a light emission surface (e.g., a top surface) of the display panel 100. The window module 200 may be in a fourth direction (e.g., a direction DR4 of FIG. 1) with respect to the display panel 100.

The display panel 100 generates an image according to an electrical signal. For example, the display panel 100 may include an organic light emitting display panel, a liquid crystal display panel, a plasma display panel, an electrophoretic display panel, or an electrowetting display panel. However, the present disclosure is not limited thereto.

A touch panel may be between the display panel 100 and the window module 200. The touch panel calculates coordinate information of an external input. The external input may include an input generated by using a stylus pen or a user's finger. The external input may be substantially generated on the window module 200. Although is not is not limited thereto, the touch panel may include a resistive touch panel, or may include a capacitive touch panel.

The window module 200 may be divided into a display area DA and a non-display area NDA. An image provided from the display panel 100 is displayed on the display area DA. The display area DA may generally be at a central portion of the window module 200.

An image is not displayed at the non-display area NDA. The non-display area NDA is adjacent the display area DA. The non-display area NDA may have a frame shape surrounding the display area DA on a plane, although this is merely an example. For example, if the non-display area NDA is adjacent the display area DA, the non-display area NDA is not limited to any shape, and may have various shapes.

In this specification, the phrase "on the plane" may denote when the display device 1000 according to an embodiment of the present disclosure is viewed in a thickness direction/second direction DR2 (e.g., viewed in a plan view).

The display device 1000 according to an embodiment of the present disclosure may further include a housing that accommodates the display panel 100. For example, the housing may be constituted by one member. Alternatively, at least two members may be coupled to each other to constitute the housing. The housing may further accommodate a circuit board on which a plurality of active elements and/or a plurality of passive elements are mounted, in addition to the display panel 100. Also, the housing may further accommodate a power source unit, such as a battery, according to a type of display device used.

The display device 1000 according to an embodiment of the present disclosure may be a portable electronic device, such as a mobile phone or a tablet computer, although the present invention is not limited thereto. For example, the display device 1000 according to an embodiment may be an electronic device having a relatively large size, such as a monitor or a television.

Figure 2:
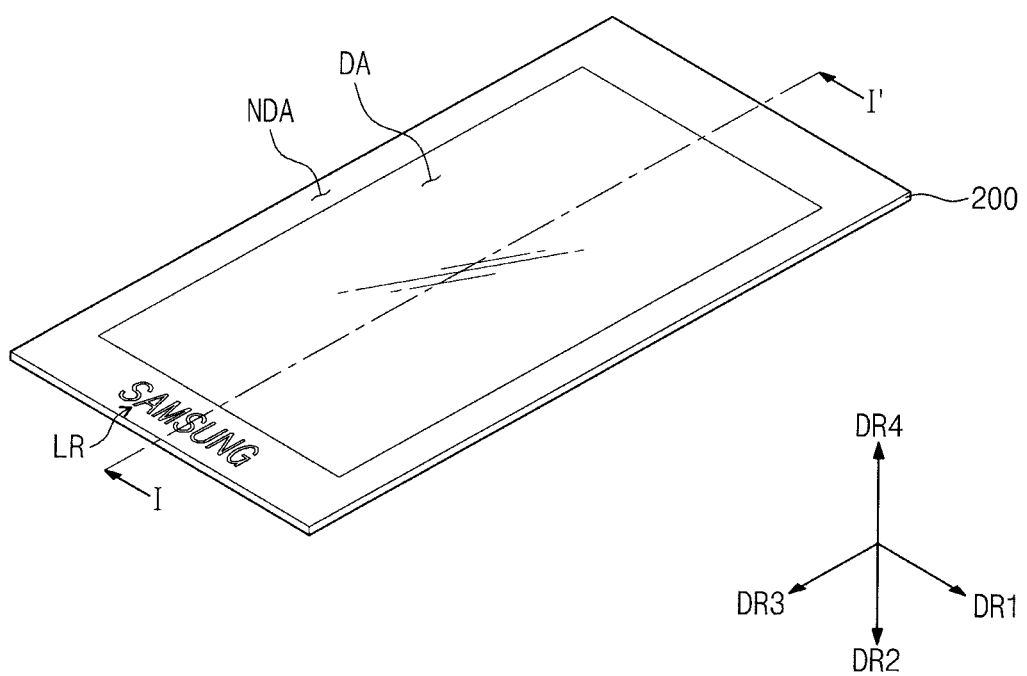
FIG. 2 is a schematic perspective view of a window module provided in the display device according to an embodiment of the present disclosure.
Figure 3:
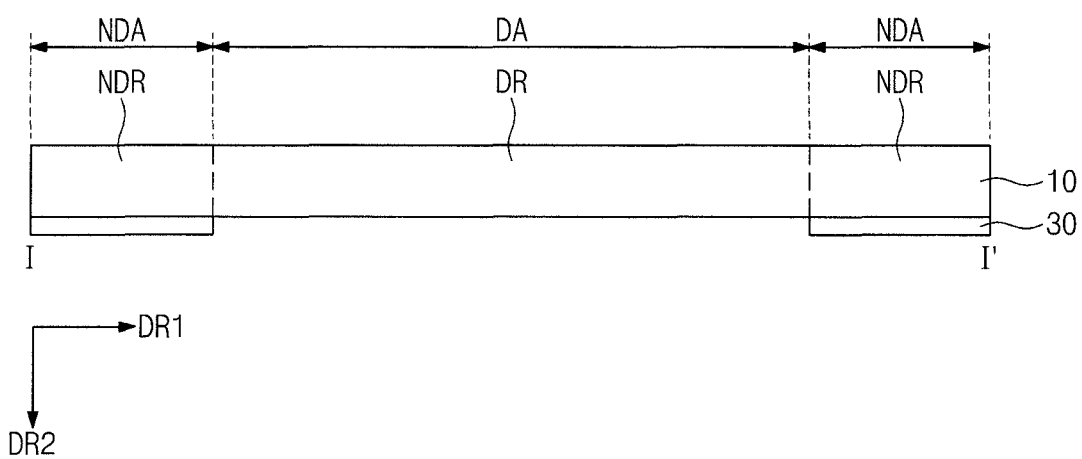
FIG. 3 is a cross-sectional view illustrating a portion of components in a structure that is taken along the line I-I' of FIG. 2.

FIG. 2 is a schematic perspective view of the window module provided in the display device according to an embodiment of the present disclosure, and FIG. 3 is a cross-sectional view illustrating a portion of components in a structure that is taken along the line I-I' of FIG. 2.

Referring to FIG. 2, at least a portion of the non-display area NDA may be defined as a logo region LR. The logo region LR may be a region in which a decoration layer (e.g., reference numeral 70 of FIG. 6A), which may include the logo of the display device 1000, is provided.

Referring to FIG. 3, the window module 200 includes a window base substrate 10. The window base substrate 10 includes, corresponds to, or is defined by, a display part DR and a non-display part/non-display region NDR. The display part DR may correspond to the display area DA of the display device 1000. The non-display part NDR may correspond to the non-display area NDA of the display device 1000. The non-display part NDR is adjacent the display part DR, and may have a frame shape surrounding the display part DR on the plane. The display part DR and the non-display part NDR may be integrated with each other. The display part DR may be transparent so that an image provided from the display panel 100 may be seen by a user. A resin layer 30, which will be described below, may be provided on only the non-display part NDR.

For example, the window base substrate 10 may include one of tempered glass and reinforced plastic. However, the present disclosure is not limited thereto. For example, the window base substrate 10 may include a resin layer having flexibility. A material for the window base substrate 10 may be employed without being particularly limited.

Hereinafter, the window module 200 provided in the display device 1000 according to an embodiment(s) of the present disclosure will be described in detail with reference to FIGS. 4 to 13.

Figure 4:
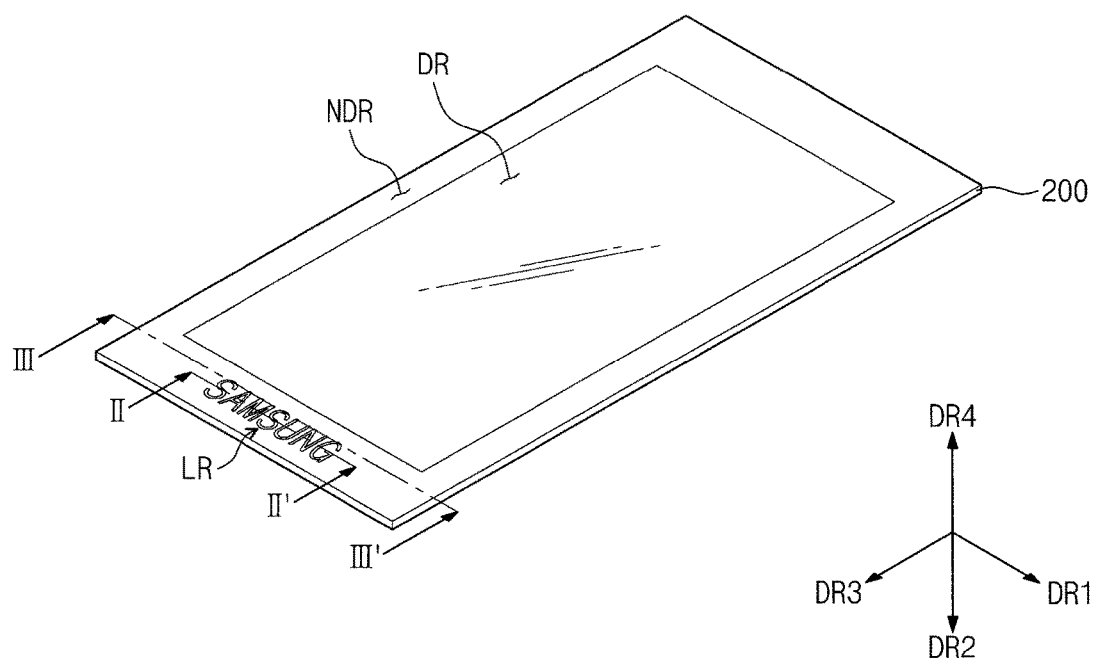
FIG. 4 is a schematic perspective view of the window module provided in the display device according to an embodiment of the present disclosure.
Figure 5A:
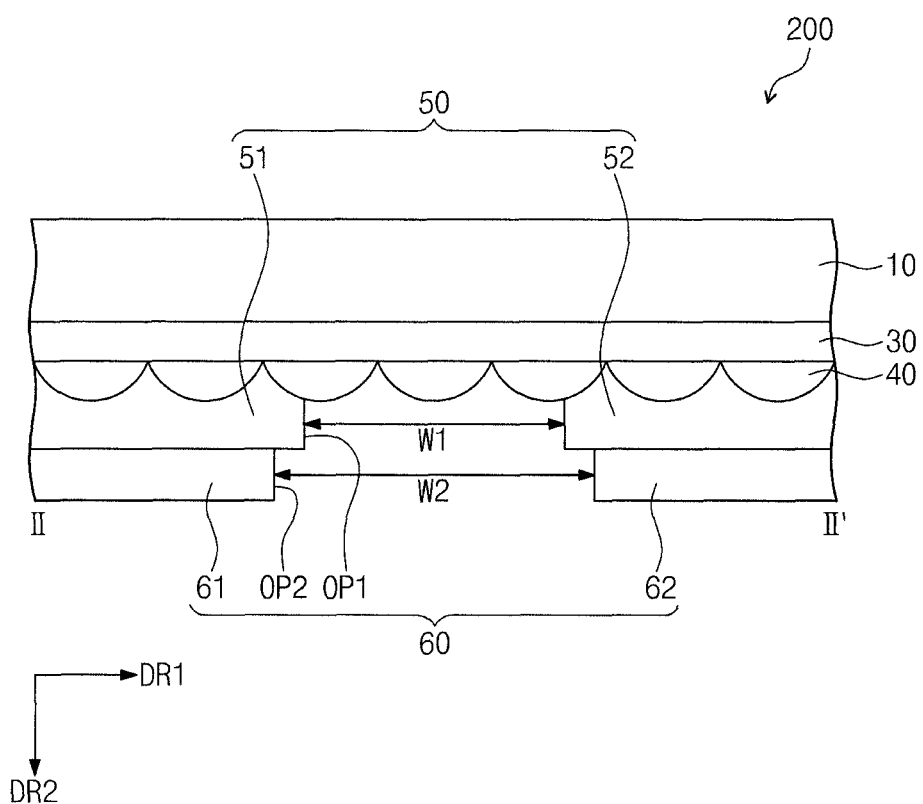
FIG. 5A is a cross-sectional view illustrating a portion of components in a structure that is taken along the line II-II' of FIG. 4 according to an embodiment.
Figure 5B:
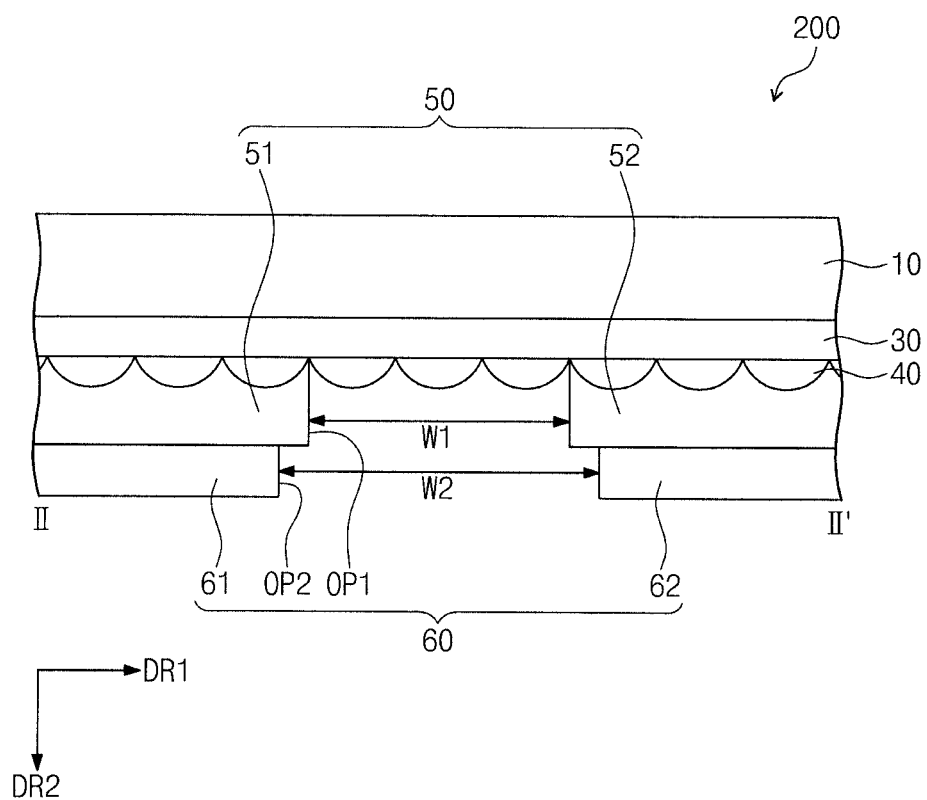
FIG. 5B is a cross-sectional view illustrating a portion of the components in the structure that is taken along the line II-II' of FIG. 4 according to another embodiment.

FIG. 4 is a schematic perspective view of the window module provided in the display device according to an embodiment of the present disclosure, FIG. 5A is a cross-sectional view illustrating a portion of components in a structure that is taken along the line II-II' of FIG. 4 according to an embodiment, and FIG. 5B is a cross-sectional view illustrating a portion of the components in the structure that is taken along the line II-' of FIG. 4 according to another embodiment.

Referring to FIGS. 4 and 5A, the window module 200 includes the window base substrate 10, a resin layer 30, an ultra violet (UV) pattern layer 40, a first color layer 50, and a second color layer 60. The window module 200 may include a decoration layer (e.g., reference numeral 70 of FIG. 6A) and a third color layer (e.g., reference numeral 80 of FIG. 6A). The resin layer 30, the UV pattern layer 40, the first color layer 50, the second color layer 60, the decoration layer 70, and the third color layer 80 are under the non-display part NDR of the window base substrate 10. The resin layer 30, the UV pattern layer 40, the first color layer 50, the second color layer 60, the decoration layer 70, and the third color layer 80 may at a bottom surface of the non-display part NDR of the window base substrate 10. The resin layer 30, the UV pattern layer 40, the first color layer 50, the second color layer 60, the decoration layer 70, and the third color layer 80 may be at a surface of the non-display part NDR of the window base substrate 10, which faces the display panel 100. The decoration layer (e.g., reference numeral 70 of FIG. 6A) and the third color layer (e.g., reference numeral 80 of FIG. 6A) will be described below in detail.

The resin layer 30 is under the non-display part NDR of the window base substrate 10. The resin layer 30 may be at the bottom surface of the non-display part NDR of the window base substrate 10. The resin layer 30 may be at an entirety of the bottom surface of the non-display part NDR of the window base substrate 10. The resin layer 30 will be described below in detail.

The UV pattern layer 40 is below, or at a lower portion of, the resin layer 30. The UV pattern layer 40 may be at a bottom surface of the resin layer 30. The UV pattern layer 40 may be at an entirety of the bottom surface of the resin layer 30. The UV pattern layer 40 may directly contact the bottom surface of the resin layer 30. The UV pattern layer 40 will be described below in detail.

The first color layer 50 is below, or at a lower portion of, the UV pattern layer 40, and may be at a portion of a lower portion of the UV pattern layer 40. The first color layer 50 may be at a bottom surface of the UV pattern layer. The first color layer 50 may contact the bottom surface of the UV pattern layer 40. The first color layer 50 may be at a portion of the bottom surface of the UV pattern layer 40. The first color layer 50 includes a first opening OP1. That is, the window module 200 includes the first color layer 50 in which the first opening OP1 is defined.

Figure 5C:
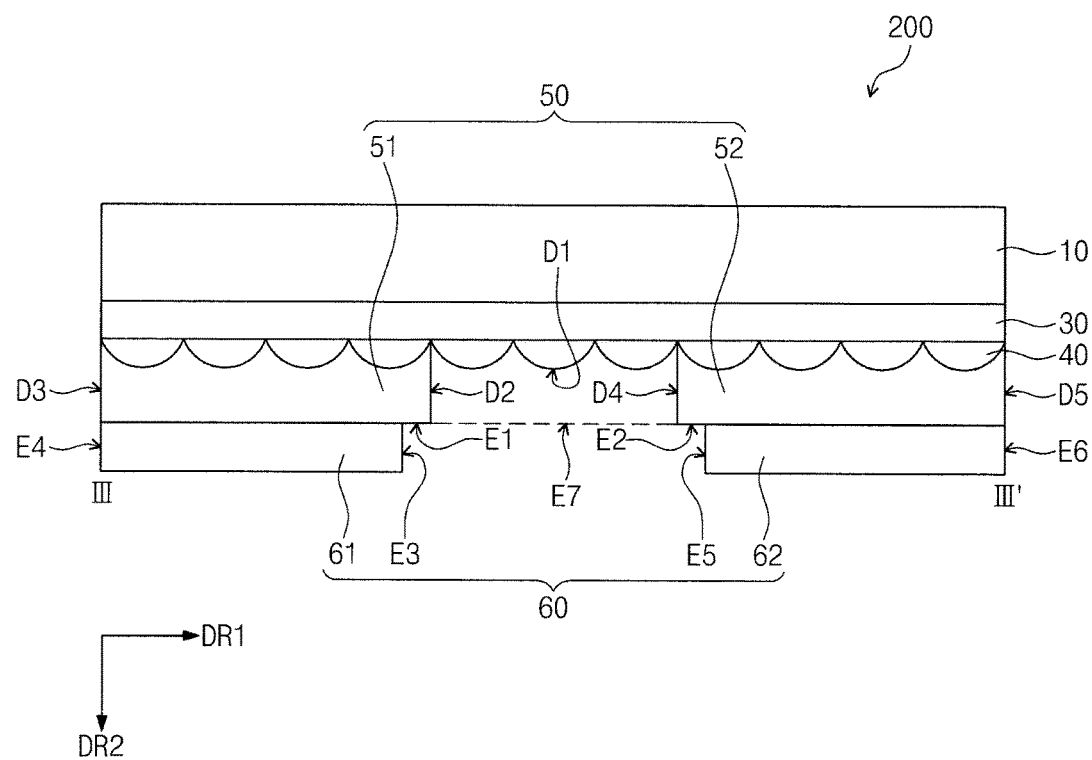
FIG. 5C is a cross-sectional view illustrating a portion of components in a structure that is taken along the line III-III' of FIG. 4.

FIG. 5C is a cross-sectional view illustrating a portion of components in a structure that is taken along the line III-III' of FIG. 4.

Referring to FIG. 5C, the first color layer 50 includes a first sub color layer 51 and a second sub color layer 52, which are spaced apart from each other. The first opening OP1 may be defined as a space between the first sub color layer 51 and the second sub color layer 52. In detail, the first sub color layer 51 may be AT a portion of the lower portion of the UV pattern layer 40, and the second sub color layer 52 may be spaced apart from the first sub color layer 51 and at a portion of the lower portion of the UV pattern layer 40. The first opening OP1 may be a region at the lower portion of the UV pattern layer 40 in which the first and second sub color layers 51 and 52 are omitted. The first opening OP1 may be at an area of the bottom surface of the UV pattern layer 40 on which the first color layer 50 is not provided.

In more detail, the first opening OP1 may be defined by a bottom surface D1 of the UV pattern layer 40, an inner surface D2 of the first sub color layer 51, and an inner surface D4 of the second sub color layer 52. The first sub color layer 51 includes an outer surface D3 that is opposite the inner surface D2, and that does not define the first opening OP1. The second sub color layer 52 includes an outer surface D5 that is opposite the inner surface D4, and that does not define the first opening OP1.

The second color layer 60 is at a lower portion of the first color layer 50, and may be at a portion of the lower portion of the first color layer 50. The second color layer 60 is at a bottom surface of the first color layer 50, and may contact the bottom surface of the first color layer 50. The second color layer 60 may be at a portion of the bottom surface of the first color layer 50. The second color layer 60 may include a second opening OP2. That is, the window module 200 includes a second color layer 60 in which the second opening OP2 is defined.

At least a portion of the second opening OP2 overlaps the first opening OP1, or corresponds to the first opening OP1. The first opening OP1 is not filled by the second color layer 60. The second color layer 60 includes a third sub color layer 61 and a fourth sub color layer 62, which are spaced apart from each other.

Referring again to FIG. 5A, the second opening OP2 has a width W2 that is greater than that W1 of the first opening OP1. Thus, a portion of the first color layer 50 may be exposed through the second opening OP2. In detail, the third sub color layer 61 may be at only a portion of the bottom surface of the first sub color layer 51, and the fourth sub color layer 62 may be at only a portion of the bottom surface of the second sub color layer 52. Here, the second opening OP2 may have the width W2, which is greater than the width W1 of the first opening OP1. The width W1 of the first opening OP1 may denote, for example, a distance value by which the first and second sub color layers 51 and 52 are spaced apart from each other in a first direction DR1. The width W2 of the second opening OP2 may denote, for example, a distance value by which the third and fourth sub color layers 61 and 62 are spaced apart from each other in the first direction DR1.

Referring to FIGS. 5A and 5C, because the second opening OP2 has the width W2 that is greater than the width W1 of the first opening OP1, portions E1 and E2 of the first color layer 50 may be exposed by the second color layer 60. In more detail, the third sub color layer 61 may at a portion of the bottom surface of the first sub color layer 51, and thus, the portion E1 of the bottom surface of the first sub color layer 51 may be exposed through the second opening OP2. Also, the fourth sub color layer 62 may be at a portion of the bottom surface of the second sub color layer 52, and thus, the portion E2 of the bottom surface of the second sub color layer 52 may be exposed through the second opening OP2. Thus, a phenomenon in which the first opening OP1 is covered or filled by the second color layer 60 due to a process tolerance may be previously prevented.

The second opening OP2 may be defined as a space between the third sub color layer 61 and the fourth sub color layer 62. In detail, the third sub color layer 61 of the second color layer 60 may be at the lower portion of the first sub color layer 51 of the first color layer 50, and the fourth sub color layer 62 of the second color layer 60 may be spaced from the third sub color layer 61, and may be at the lower portion of the second sub color layer 52 of the first color layer 50.

In more detail, the second opening OP2 may be defined by the portions E1 and E2 of the first color layer 50, and by a virtual surface/imaginary surface E7, which are exposed by an inner surface E3 of the third sub color layer 61 and an inner surface E5 of the fourth sub color layer 62. Here, the virtual surface E7 may connect one end of the inner surface D2 of the first sub color layer 51, which does not contact the UV pattern layer 40 (e.g., is opposite to the UV pattern layer 40), to one end of the inner surface D4 of the second sub color layer 52 that also does not contact the UV pattern layer 40 (e.g., the one end being opposite to the end of the inner surface D4 that contacts the UV pattern layer 40). The third sub color layer 61 includes an outer surface E4 that is opposite an inner surface E3, and that does not define the second opening OP2. The fourth sub color layer 62 includes an outer surface E6 that is opposite an inner surface E5, and that does not define the second opening OP2.

FIG. 5B is a cross-sectional view illustrating a portion of the components in the structure that is taken along the line II-II' of FIG. 4.

Referring to FIG. 5A, although one end of each of the first and second sub color layers 51 and 52 are adjacent the middle of one pattern of the UV pattern layer 40, an embodiment of the present disclosure is not limited thereto. For example, referring to FIG. 5B, one end of each of the first and second sub color layers 51 and 52 (e.g., ends respectively defining the inner surfaces D2 and D4) may be between adjacent patterns of the UV pattern layer 40.

Each of the first opening OP1 and the second opening OP2 may have various shapes on the plane. For example, each of the first opening OP1 and the second opening OP2 may have a triangular shape, a rectangular shape, an oval shape, or an irregular shape.

Hereinafter, components provided in the window module 200 will be described in more detail with reference to FIGS. 6A to 10.

FIGS. 6A to 6D are schematic cross-sectional views taken along the line II-II' of FIG. 4.

Referring to FIGS. 5A and 6A to 6D, the window module 200 includes a decoration layer 70. The decoration layer 70 is provided in the first and second openings OP1 and OP2. The first and second openings OP1 and OP2 are filled by the decoration layer 70.

The decoration layer 70 includes a cover layer 71 and a logo layer 72. The cover layer 71 is at the lower portion of the UV pattern layer 40, and the logo layer 72 is at a lower portion of the cover layer 71. The cover layer 71 and the logo layer 72 contact each other. At least a portion of the cover layer 71 is provided in the first opening OP1. At least a portion of the logo layer 72 is provided in the second opening OP2.

The cover layer 71 may reduce or prevent deterioration of an aesthetic sense of a logo of the display device otherwise caused because a pattern, which overlaps the logo layer 72 on the plane, of the pattern layer 40 is seen by the user.

The cover layer 71 may be a layer for covering the pattern of the UV pattern layer 40. To allow the cover layer 71 to cover the UV pattern layer 40 so that the UV pattern layer 40 is not seen by the user, the UV pattern layer 40 and the cover layer 71 may have the same color. In detail, a difference in light transmittance of the UV pattern layer 40 and the cover layer 71 may be small. For example, each of the UV pattern layer 40 and the cover layer 71 may have light transmittance of about 0.9 or more. Each of the UV pattern layer 40 and the cover layer 71 may have light transmittance of substantially about 1.0. Each of the UV pattern layer 40 and the cover layer 71 may be substantially transparent.

The material used for the cover layer 71 may have adhesion force with respect to the UV pattern layer 40, and may have light transmittance similar to that of the UV pattern layer 40. For example, the cover layer 71 may include a thermosetting or UV-curable material. For example, the cover layer 71 may include a urethane-based resin, an acrylic-based resin, or a silicon resin. However, an embodiment of the present disclosure is not limited thereto.

The logo layer 72 is at a lower portion of the cover layer 71. The logo layer 72 may include ink for the logo. For example, the logo layer 72 may include Al particles.

The window module 200 includes a third color layer 80 at the lower portions of the second color layer 60 and the logo layer 72. The third color layer 80 may also prevent the logo from being oxidized due to exposure to the outside/environment. The display panel 100 is at a lower portion of the third color layer 80.

The UV pattern layer 40 should not be exposed by the cover layer 71 to adequately perform the function of the cover layer 71, which prevents the UV pattern layer 40 from being seen. Thus, the cover layer 71 may have a thickness that is greater than that of the UV pattern layer 40.

Figure 6A:
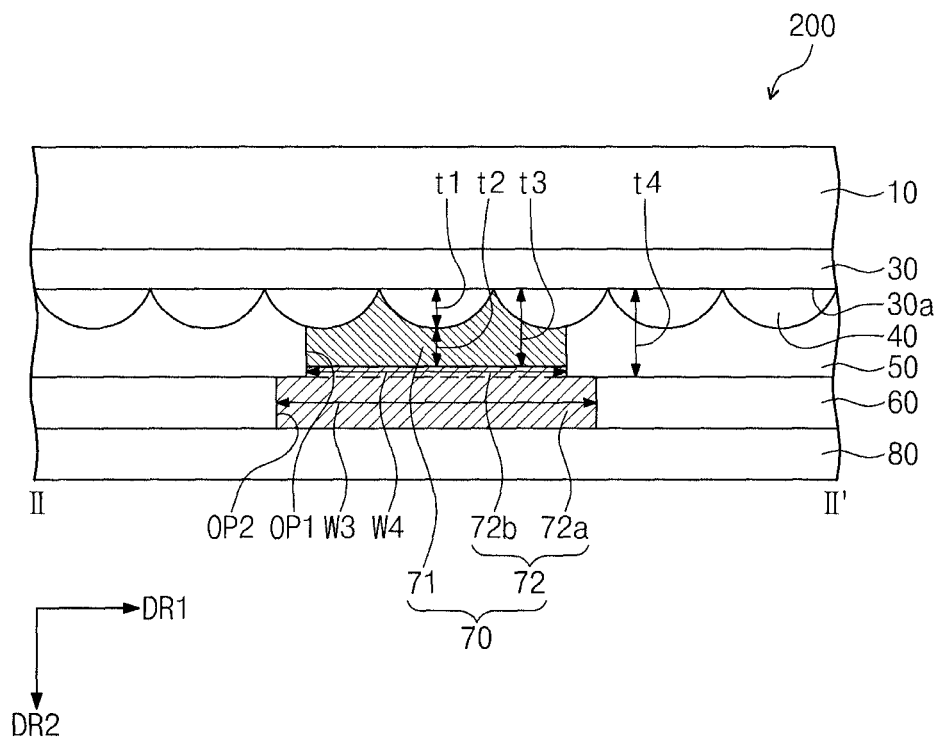
FIGS. 6A to 6D, 7, 8A, 8B, and 9 are schematic cross-sectional views taken along the line II-II' of FIG. 4 according to different embodiments.

In more detail, referring to FIG. 6A, the cover layer 71 may have a minimum thickness t2 that is greater than a maximum thickness t1 of the UV pattern layer 40. The cover layer 71 may be at the lower portion of the UV pattern layer 40, and thus may have a non-uniform thickness by the patterns. That is, the cover layer 71 may have non-uniform thickness. The minimum thickness t2 of the cover layer 71 may denote a smallest value of a straight-line distance in the second direction DR2 of the cover layer 71. The maximum thickness t1 of the UV pattern layer 40 may denote a largest value of a straight-line distance in the second direction DR2 of the UV pattern layer 40.

A maximum thickness t3 of the cover layer 71 may be less than a maximum thickness t4 of the first color layer 50. The first color layer 50 may be at the lower portion of the UV pattern layer 40, and thus may have a non-uniform thickness due to the patterns. That is, the first color layer 50 may have non-uniform thickness. The maximum thickness t3 of the cover layer 71 may denote a largest value of the straight-line distance in the second direction DR2 of the cover layer 71. The maximum thickness t4 of the first color layer 50 may denote a largest value of a straight-line distance in the second direction DR2 of the first color layer 50. Here, the logo layer 72 may include a first sub logo layer 72a in the second opening OP2, and may include a second sub logo layer 72b between the cover layer 71 and the first sub logo layer 72a. The first sub logo layer 72a and the second sub logo layer 72b may be integrated with each other. In this case, the first sub logo layer 72a may have a width W3 that is greater than a width W4 of the second sub logo layer 72b.

The width W3 of the first sub logo layer 72a may correspond to the width (see reference symbol W1 of FIG. 5A) of the first opening (see reference symbol OP1 of FIG. 5A). The width W3 of the first sub logo layer 72a may denote the largest value of a straight-line distance in the first direction DR1 of the first sub logo layer 72a. The width W4 of the second sub logo layer 72b may correspond to the width (see reference symbol W2 of FIG. 5A) of the second opening (see reference symbol OP2 of FIG. 5A). The width W4 of the second sub logo layer 72b may denote the largest value of a straight-line distance in the first direction DR1 of the second sub logo layer 72b.

Figure 6B:
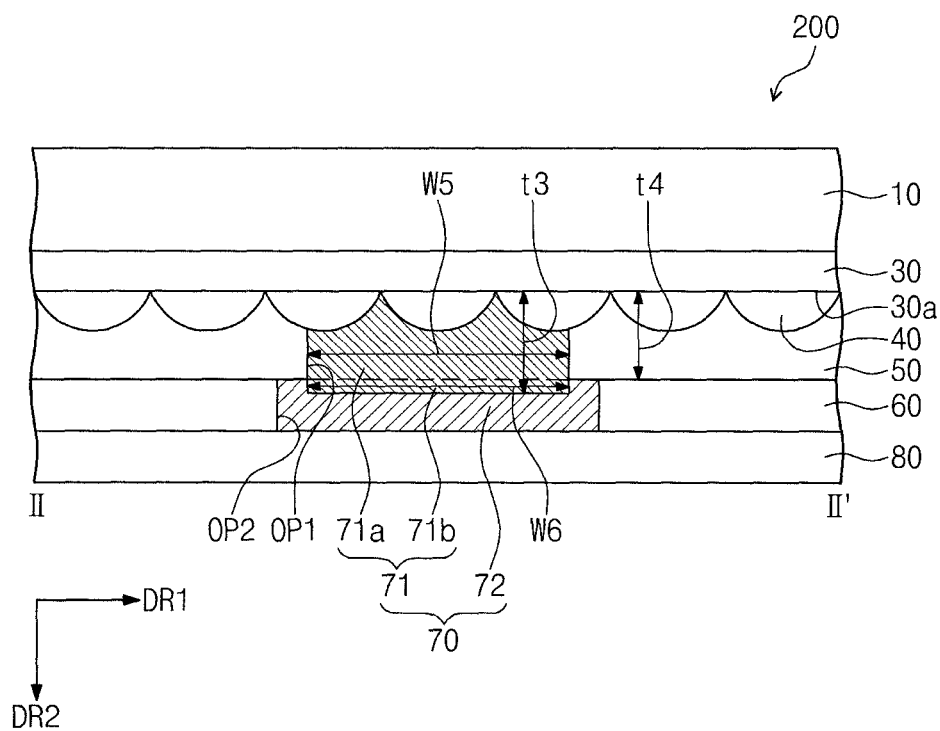

Referring to FIGS. 5A and 6B, the maximum thickness t3 of the cover layer 71 may be greater than the maximum thickness t4 of the first color layer 50. The maximum thickness t3 of the cover layer 71 and the maximum thickness t4 of the first color layer 50 may be equal, as described above. Here, the cover layer 71 may include a first sub cover layer 71a in the first opening OP1, and may include a second sub cover layer 71b between the first sub cover layer 71a and the logo layer 72. The first sub cover layer 71a and the second sub cover layer 71b may be integrated with each other. In this case, the second sub cover layer 71b may have a width W6 that is the same as a width W5 of the first sub cover layer 71a. However, an embodiment of the present disclosure is not limited thereto.

Figure 6C:
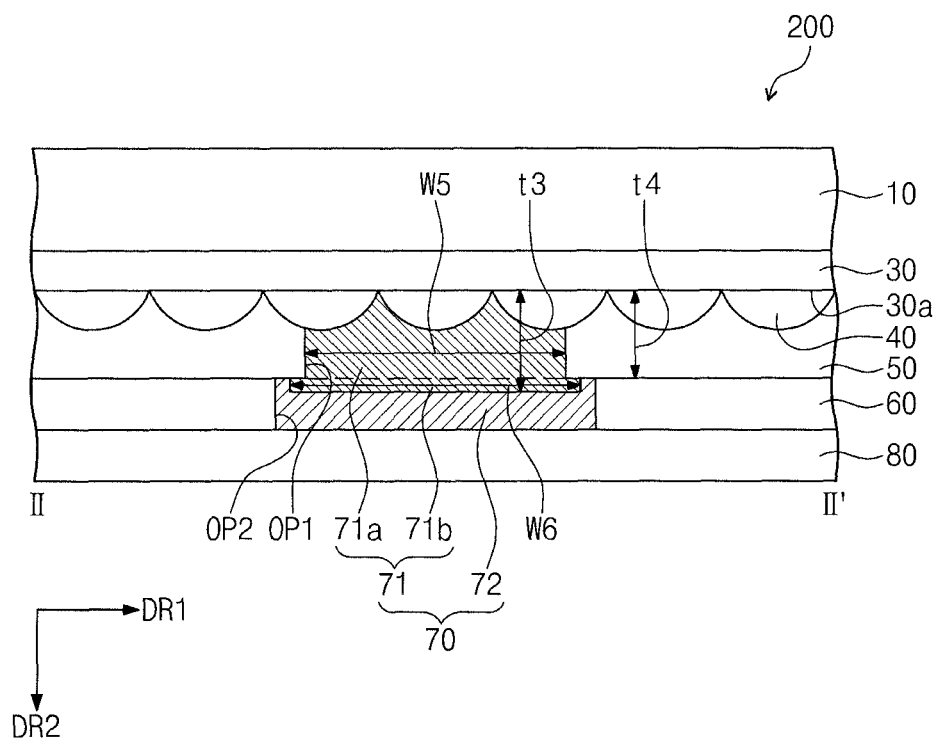

Referring to FIGS. 5A and 6C, when the cover layer 71 includes the first sub cover layer 71a and the second sub cover layer 71b, which are integrated with each other, the second sub cover layer 71b may have a width W6 that is greater than a width W5 of the first sub cover layer 71a. The width W6 of the second sub cover layer 71b may correspond to the width W2 of the second opening OP2, or may be less than the width W2 of the second opening OP2. In this case, a portion of the second sub cover layer 71b may be at the lower portion of the first color layer 50.

Figure 6D:
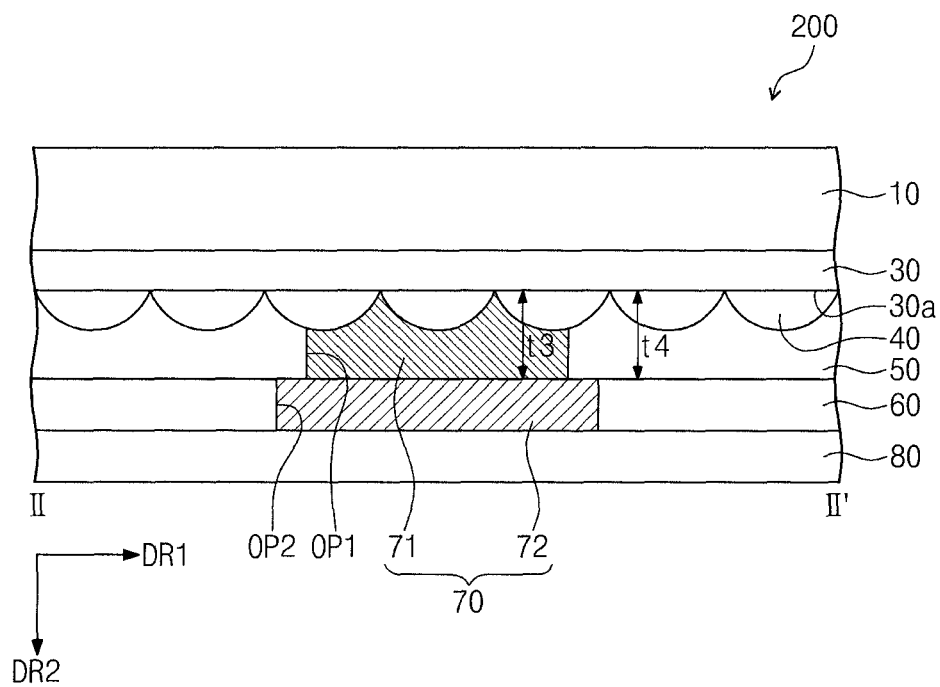

Referring to FIGS. 5A and 6D, the maximum thickness t3 of the cover layer 71 may have substantially the same value as the thickness t4 of the first color layer 50. The cover layer 71 may correspond to an entirety of first opening OP1. In this case, the logo layer 72 may correspond to an entirety of second opening OP2.

Referring to FIGS. 6A to 6D, the UV pattern layer 40 is at an entirety of the bottom surface 30a of the resin layer 30. That is, the bottom surface 30a of the resin layer 30 might not be exposed to the outside by the UV pattern layer 40. The resin layer 30 may be a film layer having a film shape. The resin layer 30 may serve as a base film layer on which the UV pattern layer 40, the first color layer 50, the second color layer 60, the decoration layer 70, and the third color layer 80 are located. The resin layer 30 may include at least one synthetic resin of PET, PVC, PP, PE, PC, and/or PMMA. The resin layer 30 may be, for example, a PET film. However, the present disclosure is not limited thereto.

Figure 7:
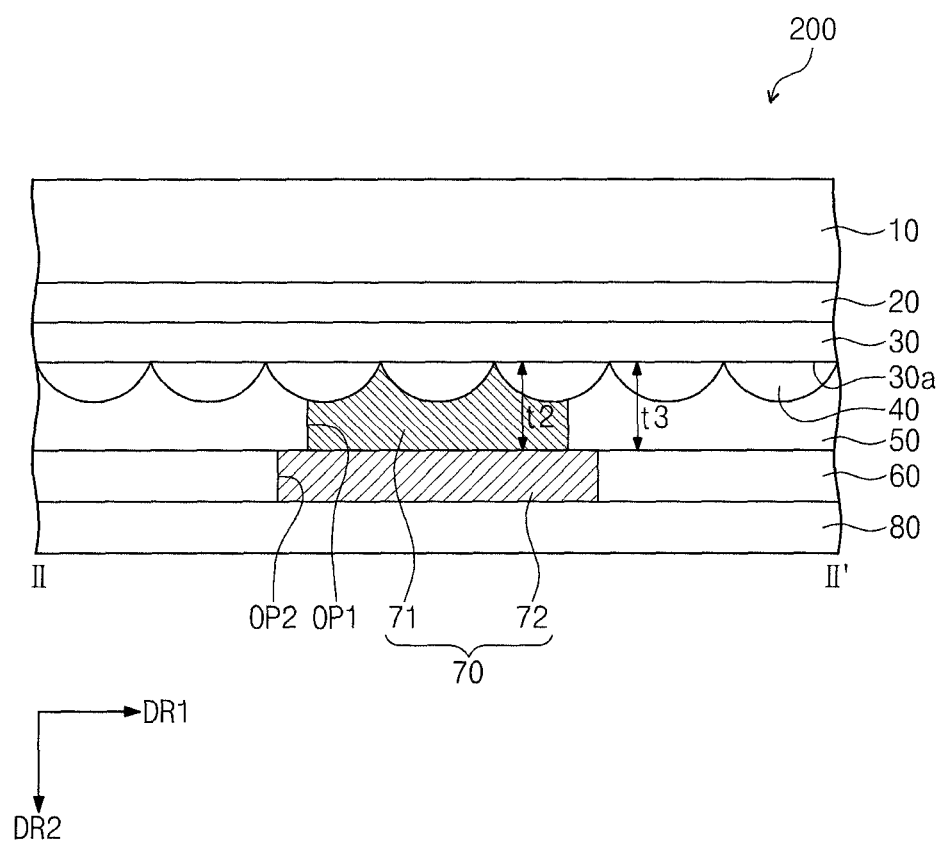

FIG. 7 is a schematic cross-sectional view taken along the line II-II' of FIG. 4.

Referring to FIG. 7, the window module 200 may further include an adhesion layer 20. The adhesion layer 20 may be at the lower portion of the window base substrate 10. The adhesion layer 20 may be between the window base substrate 10 and the resin layer 30. In more detail, the adhesion layer 20 may be at a lower portion of the non-display part NDR of the window base substrate 10. The adhesion layer 20 may be between the non-display part NDR of the window base substrate 10 and the resin layer 30.

The adhesion layer 20 may include, for example, an optical clear adhesive (OCA). However, an embodiment of the present disclosure is not limited thereto. For example, a general adhesion material, which has been well-known in the technical fields of the present disclosure, may be used for the adhesion layer 20 without being limited.

The non-display part NDR of the window base substrate 10 and the resin layer 30 may be coupled to each other by using the adhesion layer 20 as an adhesion medium. For example, the UV pattern layer 40, the first color layer 50, the second color layer 60, the decoration layer 70, and the third color layer 80 may be under the resin layer 30, and then the adhesion layer 20 may be at an upper portion of the resin layer 30 to adhere to the bottom surface of the window base substrate 10. However, an embodiment of the present disclosure is not limited thereto. For example, the adhesion layer 20 may be at the bottom surface of the window base substrate 10, and then, the adhesion layer 20 may bond the window base substrate 10 to the resin layer 30.

The UV pattern layer 40 may be formed of a UV-curable resin. The UV pattern layer 40 may be at the lower portion of the resin layer 30 by using a mold to form the pattern. The UV pattern layer 40 of FIGS. 5A to 7 may include a pattern having a lenticular shape. However, the present disclosure is not limited to the above-described shape of the pattern of the pattern layer 40.

Figure 8A:
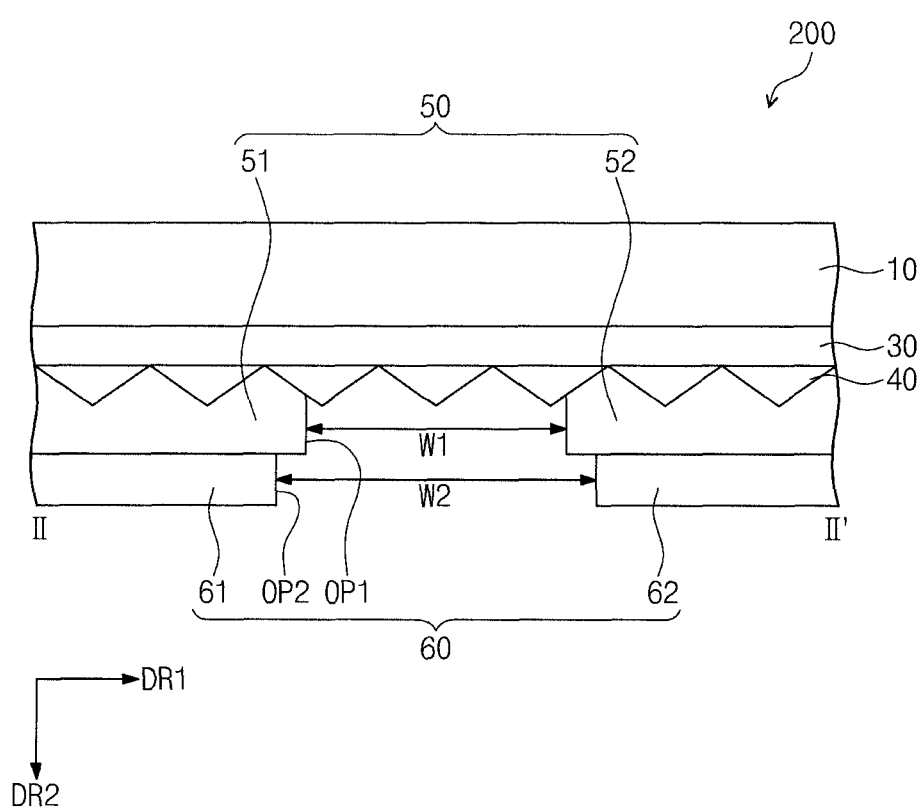
Figure 8B:
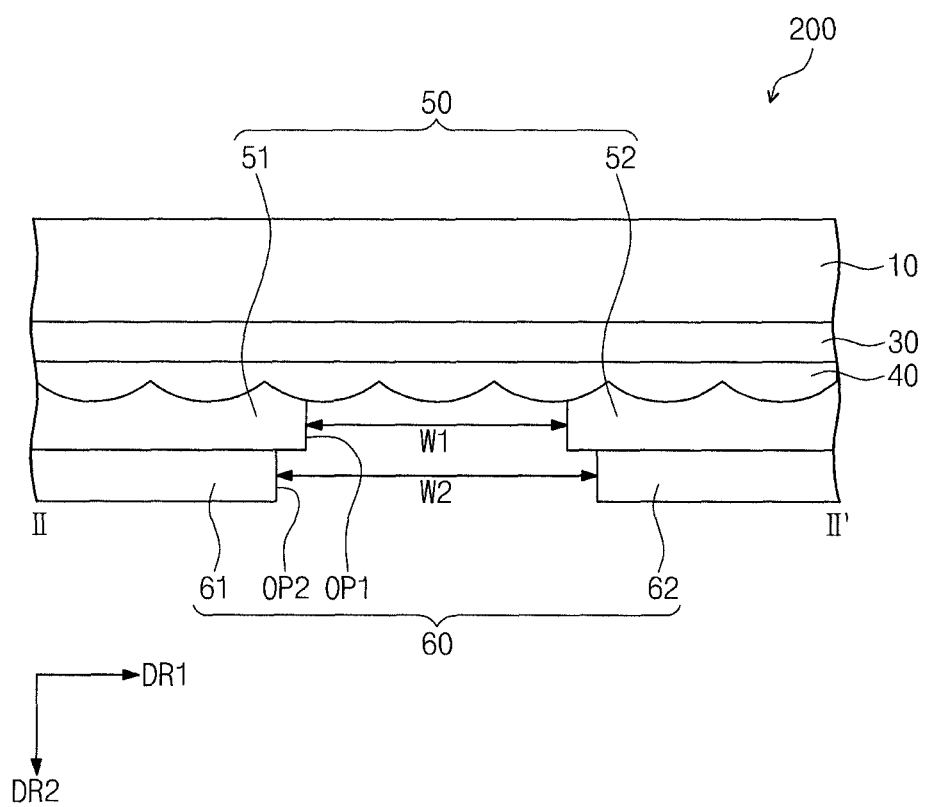

FIG. 8A is a schematic cross-sectional view taken along the line II-II' of FIG. 4, and FIG. 8B is a schematic cross-sectional view taken along the line II-II' of FIG. 4.

Referring to FIGS. 8A and 8B, the UV pattern layer 40 may include a pattern having a prism shape, or may include a pattern including a wave pattern on a lower portion thereof. The pattern of the UV pattern layer 40 may include one of a decoration pattern, a solid pattern having a fine hair-line shape, and a molding pattern. However, the present disclosure is not limited thereto. For example, the UV pattern layer 40 may include various patterns.

Figure 9:
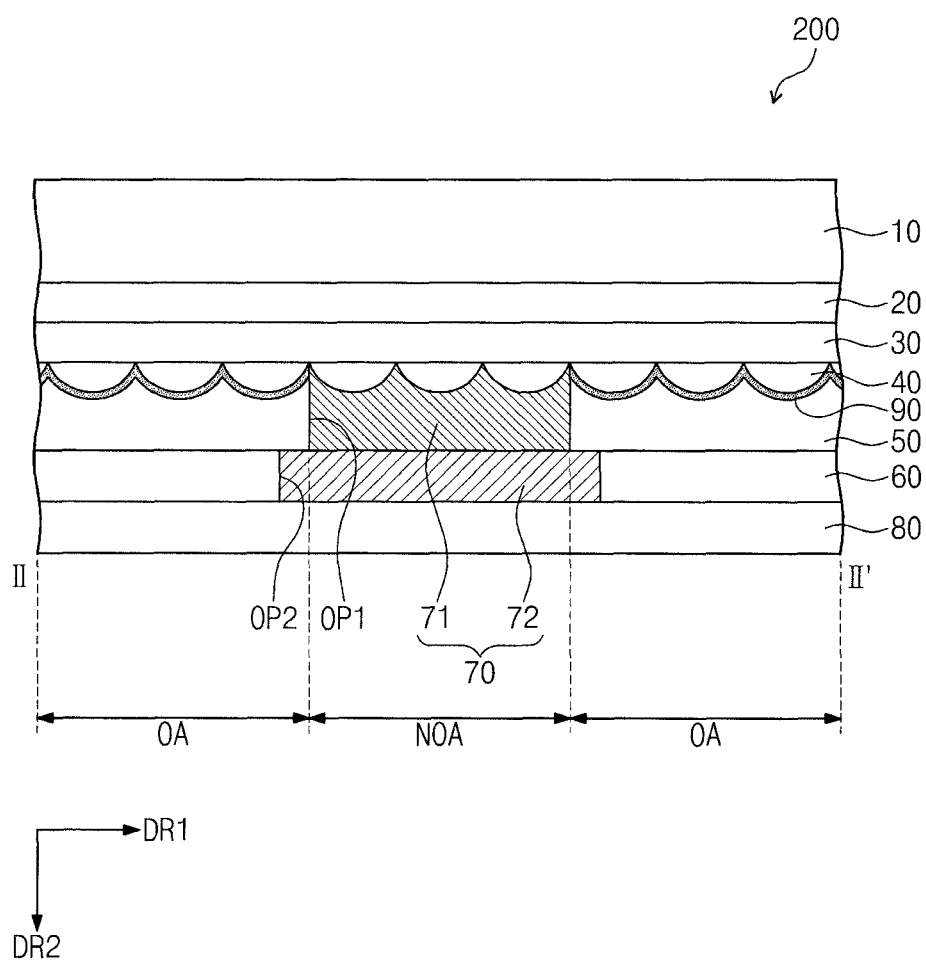

FIG. 9 is a schematic cross-sectional view taken along the line II-II' of FIG. 4.

Referring to FIG. 9, the window module 200 may further include a reflection layer 90 at the lower portion of the UV pattern layer 40. The reflection layer 90 may be at the lower portion of the UV pattern layer to allow the UV pattern layer 40 to realize a color and metal sense. The reflection layer 90 may include a reflecting material, such as a metal (e.g., a metal having reflectivity, such as aluminum, silver, and gold). The reflection layer 90 may be formed by depositing or applying a metal so that the reflection layer 90 directly contacts the lower portion of the UV pattern layer 40. However, the present disclosure is not limited thereto. For example, the reflection layer 90 may be formed by printing reflective ink on the lower portion of the UV pattern layer 40.

The reflection layer 90 may have, for example, a structure in which at least one layer formed of a high reflective material, and at least one layer formed of a low reflective material, are stacked. The high reflective material may include, for example, titanium oxide ($TiO_2$). The low reflective material may include, for example, silicon oxide ($SiO^{2-}$). The reflection layer 90 may be formed by using various materials. Also, the reflection layer 90 may be formed by using only a single-layered high reflective material layer, or by using single-layered low reflective material layer, as may be suitable.

The UV pattern layer 40 may be divided into an overlapping area OA that overlaps the first color layer 50, and a non-overlapping area NOA that does not overlap the first color layer 50 on the plane. The reflection layer 90 might be at only the lower portion of the UV pattern existing on the UV pattern layer 40 that is at the overlapping area OA. If the reflection layer 90 is also at the lower portion of the UV pattern existing on the UV pattern layer 40 that is at the overlapping area OA, the light transmittance of the UV pattern layer 40 may be reduced. Thus, the effect for preventing the UV pattern layer 40 from being seen by the user through the cover layer 71 may be incomplete.

Each of the first color layer 50, the second color layer 60, and the third color layer 80 may have substantially a black color. The first color layer 50, the second color layer 60, and the third color layer 80 may cover electrode lines of the display panel 100. Each of the first color layer 50, the second color layer 60, and the third color layer 80 may be a printed layer that is commonly called a black matrix. The second color layer 60 and the third color layer 80 may be integrated with each other.

The display device 1000 according to an embodiment of the present disclosure may further include an additional color layer on the lower portion of the third color layer 80, as may be suitable. For example, a fourth color layer may contact the bottom surface of the third color layer 80. Further, for example, the fourth color layer and a fifth color layer may be successively at the bottom surface of the third color layer 80.

Figure 10:
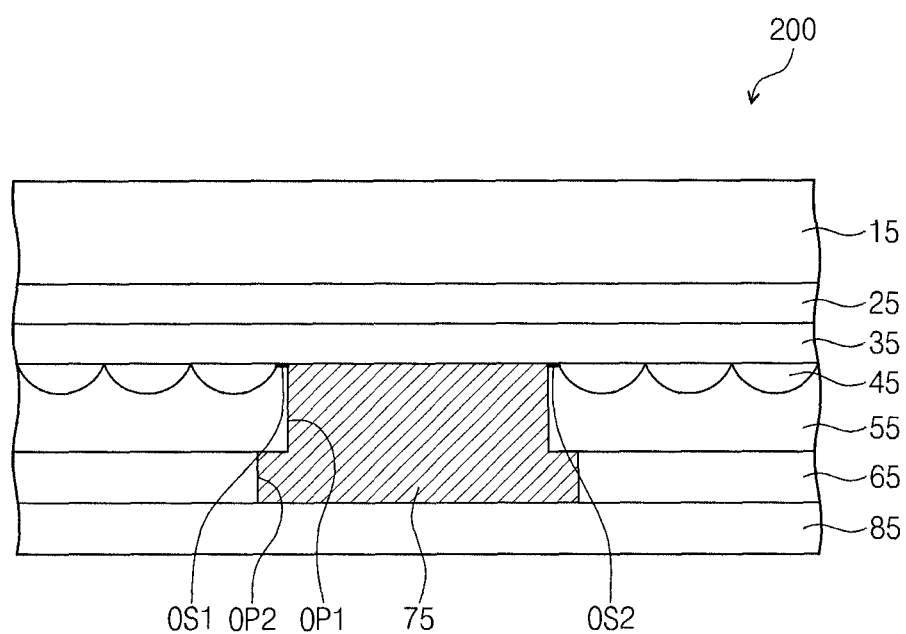
FIG. 10 is a schematic perspective view of a window module provided in the display device according to the related art.

FIG. 10 is a schematic perspective view of a window module provided in the display device according to the related art.

Referring to FIG. 10, according to the related art, to previously prevent the pattern of the UV pattern layer 45 from being seen by the user, which would otherwise deteriorate the aesthetic sense of the logo of the display device, a structure in which the UV pattern is omitted at the area of the resin layer 35 that corresponds to the location of the logo layer is used. That is, the UV pattern is not at the area of the bottom surface of the resin layer 35 on which the logo layer 75 is located. However, when the first color layer 55 defining the opening OP1 is at the lower portion of the UV pattern layer 45, it may be difficult to accurately match the opening OP1 with the area at which the UV pattern is included. Thus, offset portions OS1 and OS2 at which the first color layer 55 is located, and at which the logo layer 75 is omitted, may occur on the area at which the UV pattern is omitted from the lower portion of the resin layer 35. As a result, the offset portions OS1 and OS2 may be seen by the user, and the aesthetic sense of the logo of the display device may be deteriorated.

Referring to FIGS. 4 to 9, as described above, in the display device 1000 according to an embodiment of the present disclosure, because the UV pattern layer 40 is at an entirety of the bottom surface 30a of the resin layer 30, the occurrence of the offset portions OS1 and OS2 may be reduced or prevented. Also, the cover layer 71, which is between the logo layer 72 and the lower portion of the UV pattern existing at the area on which the logo layer 72 is located, may be removed to avoid a situation in which the UV pattern existing on the area at which the logo layer 72 is located is seen by the user. As a result, according to an embodiment of the present disclosure, the aesthetic sense of the logo of the display device 1000 may be improved.

Figure 11:
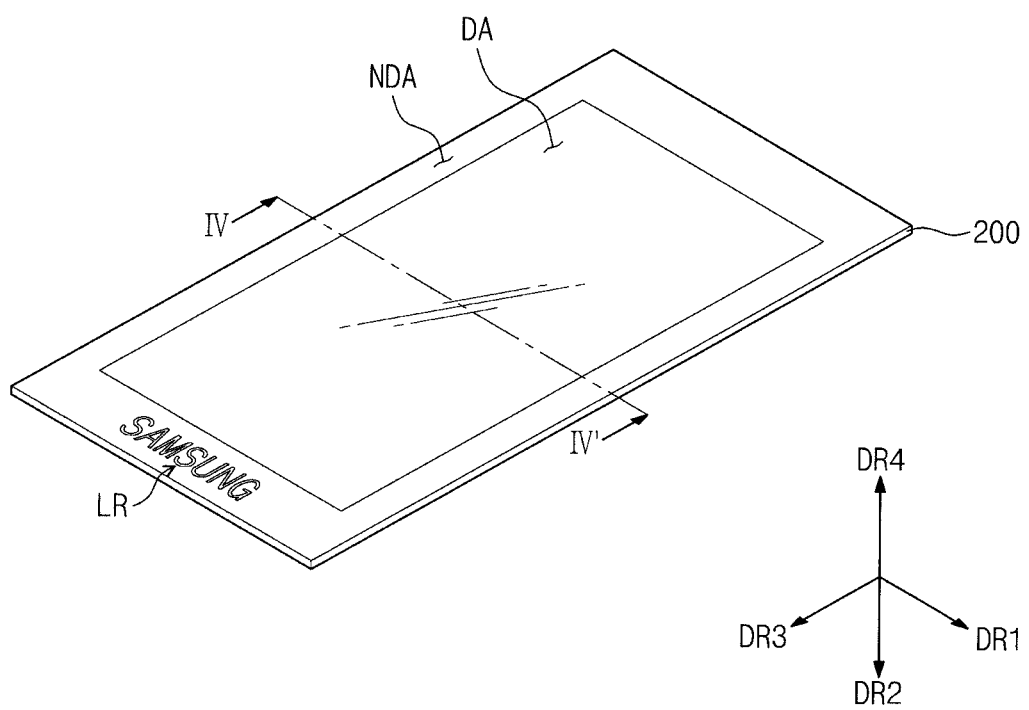
FIG. 11 is a schematic perspective view of the window module provided in the display device according to an embodiment of the present disclosure.
Figure 12A:
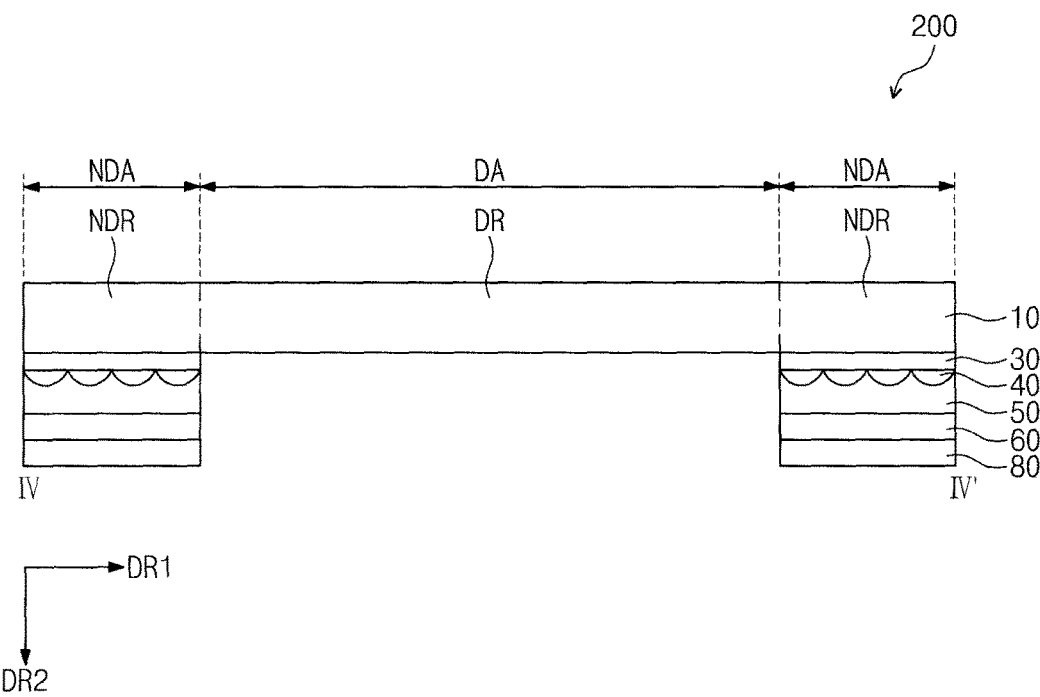
FIG. 12A is a schematic cross-sectional view taken along the line IV-IV' of FIG. 11 according to an embodiment.
Figure 12B:
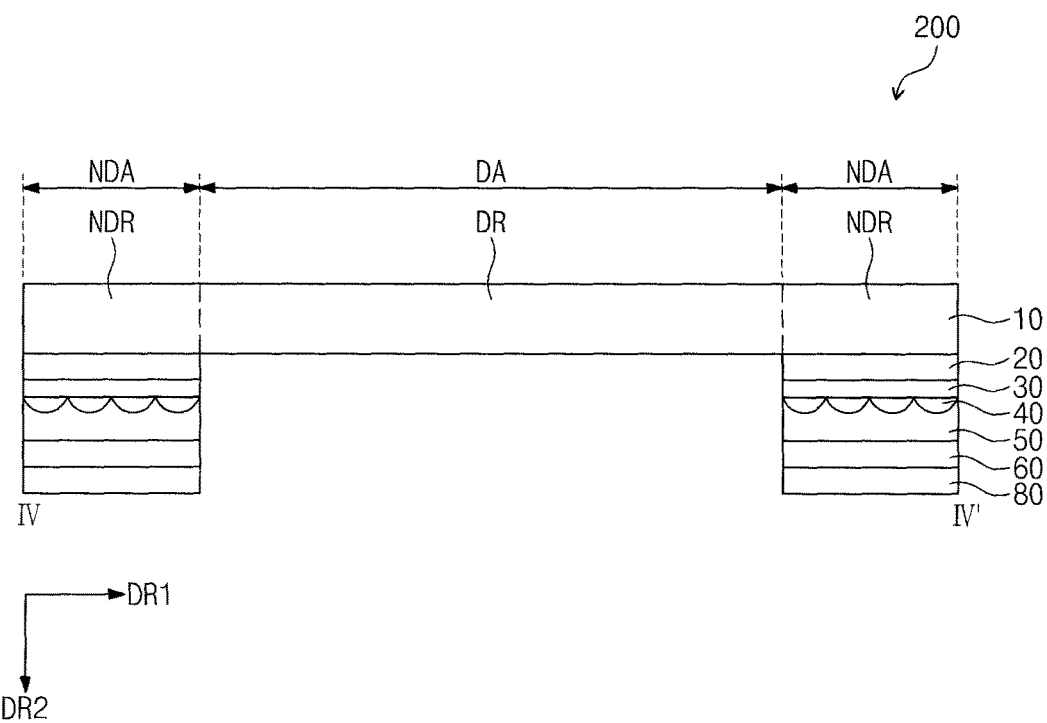
FIG. 12B is a schematic cross-sectional view taken along the line IV-IV' of FIG. 11 according to another embodiment.

FIG. 11 is a schematic perspective view of the window module provided in the display device according to an embodiment of the present disclosure, and FIGS. 12A and 12B are schematic cross-sectional views taken along the line IV-IV' of FIG. 11 according to different embodiments.

Referring to FIGS. 11, 12a, and 12b, the decoration layer (see reference numeral 70 of FIG. 6A) is included in only the logo region LR of the non-display part NDR of the window base substrate 10. That is, the first opening (see reference symbol OP1 of FIG. 5A) of the first color layer (see reference numeral 50 of FIG. 5A) and the second opening (see reference symbol OP2 of FIG. 5A) of the second color layer (see reference numeral 60 of FIG. 5A) may be defined in the logo region LR of the non-display part NDR of the window base substrate 10. The resin layer 30, the UV pattern layer 40, the first color layer 50, the second color layer 60, and the third color layer 80 are successively at the lower portion of the window base substrate 10 with the exception of the logo region LR of the non-display part NDR of the window base substrate 10. As described above, the resin layer 30 may be connected to the window base substrate 10 by using the adhesion layer 20 as an adhesion medium.

Figure 13:
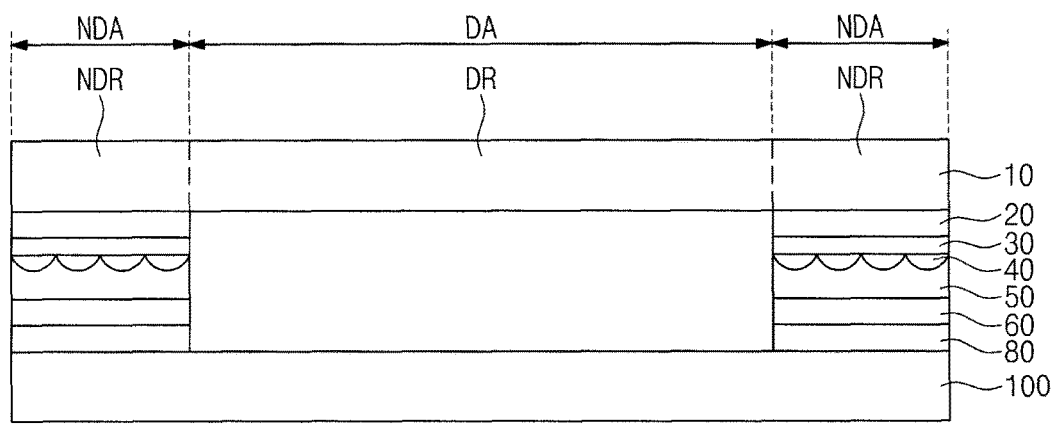
FIG. 13 is a schematic perspective view of the display device according to an embodiment of the present disclosure.
Figure 13:
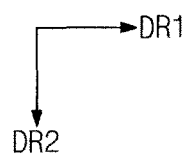

FIG. 13 is a schematic perspective view of the display device according to an embodiment of the present disclosure.

Referring to FIG. 13, the display panel 100 is at the lower portion of the third color layer 80 provided in the window module 200. Although the third color layer 80 and the display panel 100 contact each other in FIG. 13, the present disclosure is not limited thereto. For example, the third color layer 80 and the display panel 100 may be connected to each other by using the adhesion layer 20 as a medium. Also, the fourth color layer may be provided between the third color layer 80 and the display panel 100.

Hereinafter, a display device 1000 according to an embodiment of the present disclosure will be described with reference to FIGS. 6A to 9. Hereinafter, different points with respect to the display device 1000 according to the foregoing embodiment of the present disclosure will be mainly described, and thus, non-explained portions will be quoted from the display device 1000 according to the foregoing embodiment of the present disclosure.

A display device 1000 according to an embodiment of the present disclosure includes a display panel 100, and includes a window module 200 at the display panel 100. The window module 200 includes a window base substrate 10 including a display part DR and a non-display part NDR, a resin layer 30 at a lower portion of the non-display part NDR, a UV pattern layer 40 at a lower portion of the resin layer 30, a first color layer 50 at a lower portion of the UV pattern layer 40 and including a first sub color layer 51 and a second sub color layer 52, which are spaced apart from each other, a cover layer 71 at a lower portion of the UV pattern layer 40, and of which at least a portion is between the first sub color layer 51 and the second sub color layer 52, a second color layer 60 at a lower portion of the first color layer 50, and including a third sub color layer 61 and a fourth sub color layer 62, which are spaced apart from each other, a logo layer 72 at a lower portion of the cover layer 71 between the third sub color layer 61 and the fourth sub color layer 62, and a third color layer 80 at lower portions of the second color layer 60 and the logo layer 72. The display panel 10 is at a lower portion of the third color layer 80.

The cover layer 71 may contact each of the first and second sub color layers 51 and 52. The logo layer 72 may contact each of the third and fourth sub color layers 61 and 62. A portion of the cover layer 71 may contact each of the third and fourth color layers 61 and 62. A portion of the logo layer 72 may contact each of the first and second sub color layers 51 and 52.

Detailed descriptions with respect to each of the components may apply the above-described descriptions as they are. For example, the cover layer 71 may have a minimum thickness t2 that is greater than a maximum thickness t1 of the UV pattern layer 40. For another example, each of the UV pattern layer 40 and the cover layer 71 may have light transmittance of about 0.9 or more (e.g., about 1.0). In addition, detailed descriptions with respect to each of the components may be followed by the above-described descriptions.

According to the embodiments of the present disclosure, there is provided the display device in which the aesthetic sense of the logo of the display device is improved.

According to the embodiments of the present disclosure, the display device including the window member on which the aesthetic sense of the logo layer is improved may be provided.

Although the embodiment of the present disclosure is described with reference to the accompanying drawings, those with ordinary skill in the technical field of the present disclosure pertains will be understood that the present disclosure can be carried out in other specific forms without changing the technical idea or essential features. Thus, the above-disclosed embodiments are to be considered illustrative and not restrictive.

What is claimed is:

1. A display device comprising:
   a window module comprising:
      a window base substrate comprising a display part and a non-display part;
      a resin layer below a lower portion of the window base substrate at the non-display part;
      an ultra violet (UV) pattern layer below a lower portion of the resin layer;
      a first color layer below a lower portion of the UV pattern layer, and defining a first opening;
      a second color layer below a lower portion of the first color layer, and defining a second opening at least partially overlapping the first opening;
      a decoration layer in the first and second openings, and comprising:
         a cover layer below the lower portion of the UV pattern layer; and
         a logo layer below a lower portion of the cover layer; and
      a third color layer below lower portions of the second color layer and the decoration layer; and
   a display panel below a lower portion of the third color layer.

2. The display device of claim 1, wherein each of the UV pattern layer and the cover layer has light transmittance of about 0.9 or more.

3. The display device of claim 1, wherein the cover layer has a minimum thickness that is greater than a maximum thickness of the UV pattern layer.

4. The display device of claim 1, wherein the cover layer has a maximum thickness that is less than a maximum thickness of the first color layer.

5. The display device of claim 4, wherein the logo layer comprises:
   a first sub logo layer in the second opening; and
   a second sub logo layer in the first opening, between the cover layer and the first sub logo layer, and integrated with the first sub logo layer.

6. The display device of claim 5, wherein the first sub logo layer has a width that is greater than a width of the second sub logo layer.

7. The display device of claim 1, wherein the cover layer has a maximum thickness that is greater than a maximum thickness of the first color layer.

8. The display device of claim 7, wherein the cover layer comprises:
   a first sub cover layer in the first opening; and
   a second sub cover layer in the second opening, between the first sub cover layer and the logo layer, and integrated with the first sub cover layer.

9. The display device of claim 8, wherein the second sub cover layer has the same width as the first sub cover layer.

10. The display device of claim 8, wherein the second sub cover layer has a width that is greater than a width of the first sub cover layer.

11. The display device of claim 1, wherein an entirety of a bottom surface of the resin layer is covered by the UV pattern layer.

12. The display device of claim 1, wherein the second opening has a width that is greater than a width of the first opening, and exposes a portion of the first color layer.

13. The display device of claim 12, wherein the first color layer comprises a first sub color layer and a second sub color layer, which are spaced apart from each other,
   wherein the second color layer comprises a third sub color layer and a fourth sub color layer, which are spaced apart from each other,
   wherein the first opening is defined by a bottom surface of the UV pattern layer, an inner surface of the first sub color layer, and an inner surface of the second sub color layer, and
   wherein the second opening is defined by an inner surface of the third sub color layer, an inner surface of the fourth sub color layer, a portion of the first color layer that is exposed by the second opening, and a virtual surface that is defined by connecting ends of the inner surfaces of the first and second sub color layers that are opposite to the UV pattern layer.

14. The display device of claim 1, further comprising an adhesion layer between the window base substrate and the resin layer.

15. The display device of claim 1, wherein the UV pattern layer comprises a pattern having a lenticular shape.

16. The display device of claim 1, further comprising a reflection layer,
   wherein the UV pattern layer is divided into an overlapping area that overlaps the first color layer, and a non-overlapping area that does not overlap the first color layer, and
   wherein the reflection layer is at the lower portion of the UV pattern at only the overlapping area.

17. A display device comprising:
   a window module comprising:
      a window base substrate comprising a display part and a non-display part;
      a resin layer below a lower portion of the window base substrate at the non-display part;
      an ultra violet (UV) pattern layer below a lower portion of the resin layer;
      a first color layer below a lower portion of the UV pattern layer, and comprising a first sub color layer and a second sub color layer, which are spaced apart from each other;
      a cover layer below the lower portion of the UV pattern layer, and at least partially between the first sub color layer and the second sub color layer;

a second color layer below the first color layer, and comprising a third sub color layer and a fourth sub color layer, which are spaced apart from each other;

a logo layer below a lower portion of the cover layer, and between the third sub color layer and the fourth sub color layer; and a third color layer below lower portions of the second color layer and the logo layer; and a display panel below a lower portion of the third color layer.

18. The display device of claim 17, wherein each of the UV pattern layer and the cover layer has light transmittance of about 0.9 or more.

19. The display device of claim 17, wherein the cover layer has a minimum thickness that is greater than a maximum thickness of the UV pattern layer.

20. The display device of claim 17, wherein the cover layer contacts each of the first and second sub color layers, and wherein the logo layer contacts each of the third and fourth sub color layers.

* * * * *